J. C. CONN.
BELT FASTENER.
APPLICATION FILED OCT. 3, 1910.
1,015,783.  Patented Jan. 30, 1912.
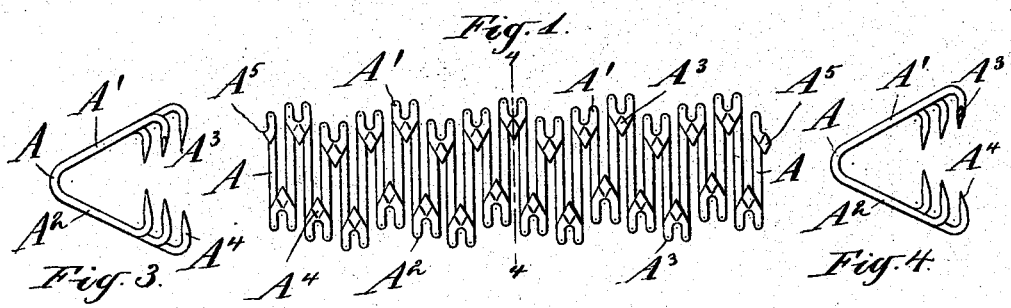
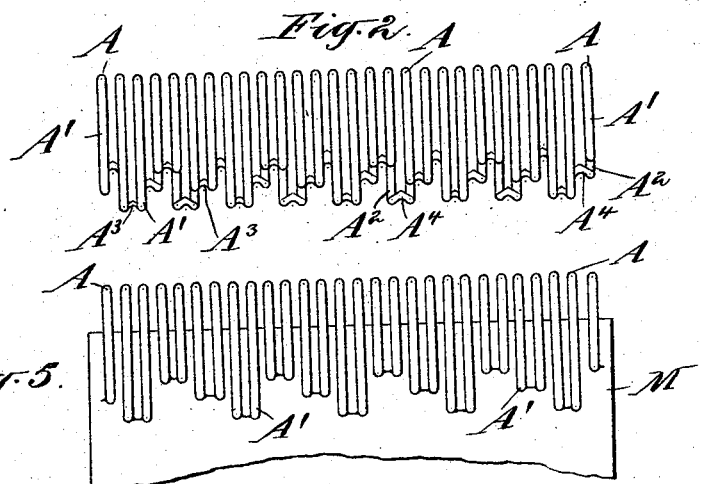
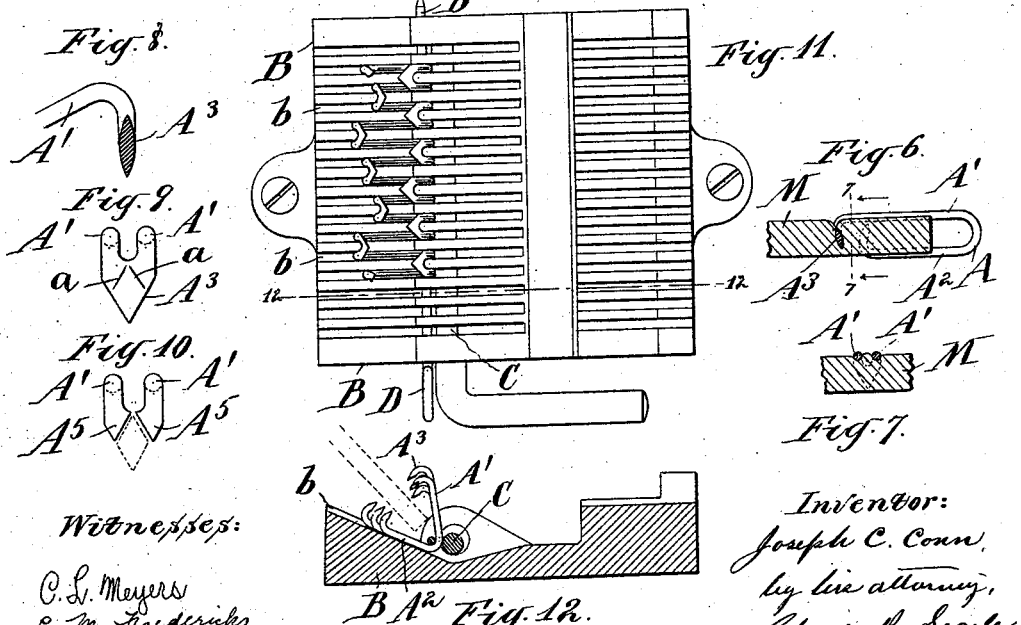
Witnesses:
C. L. Meyers
E. M. Fredericks
Inventor:
Joseph C. Conn,
by his attorney,
Charles H. Searle.

UNITED STATES PATENT OFFICE.

JOSEPH C. CONN, OF BOONTON, NEW JERSEY, ASSIGNOR TO J. B. STONE CO., OF GRAND RAPIDS, MICHIGAN, A CORPORATION OF MICHIGAN.

BELT-FASTENER.

1,015,783. Specification of Letters Patent. Patented Jan. 30, 1912.

Application filed October 3, 1910. Serial No. 585,047.

*To all whom it may concern:*

Be it known that I, JOSEPH C. CONN, a citizen of the United States, residing in Boonton, in the county of Morris and State of New Jersey, have invented a certain new and useful Improvement in Belt-Fasteners, of which the following is a specification.

The invention relates to means for joining the ends of power belts, and more particularly to that class of wire fasteners having divergent arms equipped with spurs, known as "belt-hooks." Fasteners of this type are made singly, entailing considerable labor in arranging, spacing and fastening upon the belt-end.

The main object of the present invention is to avoid this objectionable feature by providing a continuous length or series of connected fasteners, properly arranged and spaced for attachment to the belt.

Another important object is to provide a fastener adapted to be thus formed, constructed to engage strongly in the material of the belt and resist the severe tensile strains to which it is subjected in service.

A further object of the invention is to provide an arrangement by which the series may be easily severed to permit the removal of a portion or section, without waste, and when thus divided the severed end of each part will be left in condition to engage in the belt, and, as a general object, to provide a belt fastening means of this character, formed by bending and shaping a continuous wire into a connected series of spurred arms, which may be economically manufactured and conveniently applied.

The invention consists in certain novel features of construction and arrangement of parts by which the above objects are attained, to be hereinafter described.

The accompanying drawings form a part of this specification and show an approved form of the invention.

Figure 1 is a face view of a section of connected fasteners. Fig. 2 is a top or plan view of the same. Fig. 3 is an end view corresponding to Fig. 1. Fig. 4 is a transverse section on the line 4—4 in Fig. 1. Fig. 5 is a plan view showing the section of fasteners applied on a belt-end. Fig. 6 is a corresponding section on a line parallel with the arms of the spurs. Fig. 7 is a section on the line 7—7 in the preceding figure, seen in the direction indicated by the arrows. Fig. 8 is a section through one of the spurs on a larger scale. Fig. 9 is a face view of such spur. Fig. 10 is a similar view showing the spur divided as in severing a portion of the series. Fig. 11 is a plan view of an implement used in attaching the fasteners to a belt-end. Fig. 12 is a section of the same implement, taken on the line 12—12 in Fig. 11, certain portions being shown in elevation, and the belt-end indicated by dotted lines.

Similar letters of reference indicate the same parts in all the figures.

The series of fasteners may be in any length and comprises a succession of parallel loops or convolutions formed by bending a continuous wire, each joined to the next by a spur formed by shaping the bight of the loop. The series of convolutions is bent or partially folded upon itself to produce two series of pairs of divergent arms extending angularly from the bend or partial fold A; for convenience of description one series $A^1$ will be termed the upper arms and the other $A^2$, the lower arms but both series are or may be alike and either may apply to the upper or lower face of the belt-end M.

The spurs $A^3$ formed by flattening and pointing the upper loops are bent downwardly and slightly inwardly and form the connection between the pairs of parallel upper arms $A^1$. The spurs $A^4$ similarly join the pairs of lower arms $A^2$ and are bent upwardly and inwardly, and as the convolutions are continuous and parallel the upper and lower spurs alternate or lie each between two of the opposite row, as shown in Figs. 1 and 2; thus each spur engages in the belt-end between two on the other face of the belt, and the liability to tear the latter under the strain of power transmission is lessened. To further diminish this danger the spurs $A^3$ are staggered or stepped relatively to each other by varying the lengths of the pairs of arms $A^1$, and the lower spurs $A^4$ are similarly arranged. Each row of spurs is preferably of successive groups of three lengths each, long, medium, and short and the groups in one row overlap those in the other so that "long" in the lower row is located between "medium" and "short" in the upper row, and "short" in the lower row lies between "long" and "medium" in the upper row, while "medium" of the lower row falls between "long" and "short" of two adjacent groups in the upper row. Thus staggered and arranged each spur is driven into the material of the belt at considerable distance from the next in the same or the opposite row and a continuous weakened line of engagement is avoided.

It will be noted that the tensile strain on each spur is borne by two parallel arms which when partially embedded in the belt, as in Figs. 6 and 7, produce a tongue or ridge between each pair serving to aid in resisting the disengagement of the spur due to lifting and torsional strains. The twin arm arrangement also facilitates the attachment of the spur to the belt by offering two slightly separated driving surfaces and insures a straight entrance under pressure or blows upon both arms.

In dividing the series into lengths as may be required for belts of different widths the line of division is preferably through the spur. In the arrangement shown, each spur is indented or scored as at a a, see Fig. 9, to offer breaking lines which with the outline of the lower end of the spur form a lozenge or diamond. After separation this diamond-shaped piece remains attached to one arm from which it may be removed, as in Fig. 10, to leave each adjacent arm equipped with a short engaging point or spur adapted to be driven into the belt with the others so that all arms are engaged and no portion of the series is wasted in the division.

Figs. 11 and 12 show an implement used in attaching belt-hooks of this type to the belt-ends. It comprises a bed B having grooves b in which the lower arms A² are received with the bends A resting against an eccentrically mounted rod C extending transversely through the lands between the grooves. A pin D is then thrust through the lands, engaging the bends A, and the rod C turned to force the bends against the pin and hold the section in place. A belt-end is then inserted between the rows of spurs which are then beaten or forced into the material of the belt and driven home as usual.

An important advantage due to the connected construction is the elasticity of the series or its capability of expansion or contraction which greatly facilitates placing the arms in the grooves of a tool of this character. Another feature of advantage in the continuous structure is its flexibility, permitting a long length to be coiled or wound upon itself in a helix of small diameter in packing and storing the fasteners.

Modifications may be made in the forms and proportions of the parts without departing from the invention as claimed. The form of the spurs may be varied from that shown and described, and the weakened line for facilitating separation may be differently located.

The improved fastener is designed to be formed by suitable wire-working machinery and may be thus manufactured economically and with the necessary uniformity.

I claim:—

1. A plurality of belt-hooks of the character set forth formed in connected series from a continuous length of wire having portions to embrace both sides of a belt end, said hooks having arms, the adjacent arms being of different lengths with spurs joining adjacent arms, the outermost spurs constructed to be easily severable.

2. A plurality of belt-hooks comprising connected pairs of upper and lower arms formed from a continuous length of wire having portions to embrace both sides of a belt-end, and a spur formed integral with and joining each arm to the adjacent arm of its pair.

3. A plurality of belt-hooks comprising a connected series of pairs of upper and lower arms formed from a continuous length of wire, and a spur formed integral with and joining each arm to the adjacent arm of its pair, said spurs constructed to be easily severed in dividing the series.

4. A plurality of belt-hooks comprising a connected series of pairs of upper and lower arms formed from a continuous length of wire, a spur formed integral with and joining each arm to the adjacent arm of its pair, and each having a weakened line along which said spur is severable in dividing the series.

5. A plurality of belt-hooks comprising a connected series of pairs of upper and lower arms formed from a continuous length of wire, a spur formed integral with and joining each arm to the adjacent arm of its pair, and each having a weakened line along which said spur is severable in dividing the series, said spur constructed when thus divided to form an engaging point on each end of said adjacent arms.

6. A plurality of belt-hooks comprising a connected series of pairs of upper and lower arms formed from a continuous length of wire, a spur formed integral with and joining each arm to the adjacent arm of its pair, the pairs of arms of said upper and lower series connected by folds and constructed to extend in the direction of the length of the belt and varying in length to present the spurs of each series in staggered relation to each other and to the spurs of the other series upon opposite sides of the belt-end.

7. A plurality of belt-hooks comprising a connected series of divergent pairs of upper and lower arms formed from a continuous length of wire, said pairs of upper and lower arms constructed to receive therebetween the end of a belt the arms of each of said pairs parallel with the other arms of the same series, and a spur formed integral with and severably joining each arm to the adjacent arm of its pair.

8. A belt hook having arms in pairs with integral bent joining portions, the adjacent arms of adjacent pairs being united at their ends opposite said adjacent pairs by a spur.

In testimony that I, claim the invention above set forth I affix my signature, in presence of two witnesses.

JOSEPH C. CONN.

Witnesses:
CHARLES R. SEARLE,
WALLY E. YOUNG.

Copies of this patent may be obtained for five cents each, by addressing the "Commissioner of Patents, Washington, D. C."